United States Patent

Singelmann et al.

[15] 3,688,732
[45] Sept. 5, 1972

[54] PROPULSION SYSTEM FOR WATER CRAFT

[72] Inventors: Dietrich E. Singelmann, Ottobrunn; Heinrich Hofmann, Grobenzell, both of Germany

[73] Assignee: Messerschmitt-Bolkow-Blohm Gesellschaft mit beschrankter Hartung, Munich, Germany

[22] Filed: Dec. 12, 1969

[21] Appl. No.: 884,545

[52] U.S. Cl. ...................................................115/37
[51] Int. Cl. ............................................B63h 5/10
[58] Field of Search ...............115/34, 37; 416/170

[56] References Cited

UNITED STATES PATENTS

| | | | |
|---|---|---|---|
| 3,270,699 | 9/1966 | Bush | 114/66.5 H |
| 3,369,514 | 2/1968 | Cockerell | 115/37 |
| 3,447,611 | 6/1969 | Larsson et al. | 416/170 X |

*Primary Examiner*—Trygve M. Blix
*Attorney*—McGlew and Toren

[57] ABSTRACT

A propulsion system for water craft and in particular for high speed propulsion such as for torpedos, hydrofoil craft, and the like, includes a power engine, particularly a gas turbine, which is connected through a reducing transmission to a shaft drive. The shaft drive permits the rotation of two ship screws independently of each other and advantageously includes one drive shaft arranged concentrically within a hollow outer drive shaft for the respective screws. One of the shafts and the associated screw is connected for driving in the lower velocity range and rotates at a relatively low speed of rotation and the other screw is connected for operation at high velocity range and rotates at higher speeds of rotation. Preferably the ship screw for high cruising speed is provided in front of the ship screw for a lower cruising speed and the forward ship screw advantageously provides a guiding blading for the rear ship screw. The ship screw for low speeds may be removed such as by blasting it off with an explosive charge after the propulsion has been taken over by the high speed screw. Instead of arranging the shafts of the screws coaxially they may be arranged one above the other such that the low speed screw is lifted up out of the water when the vessel, such as a hydrofoil vessel, reaches a planing speed.

10 Claims, 4 Drawing Figures

PATENTED SEP 5 1972　　3,688,732
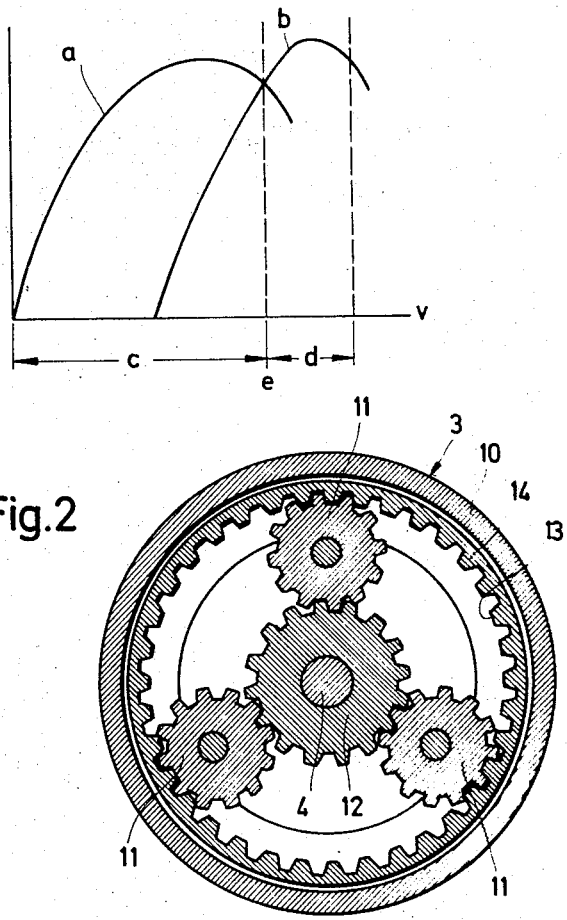
Fig.3
Fig.2
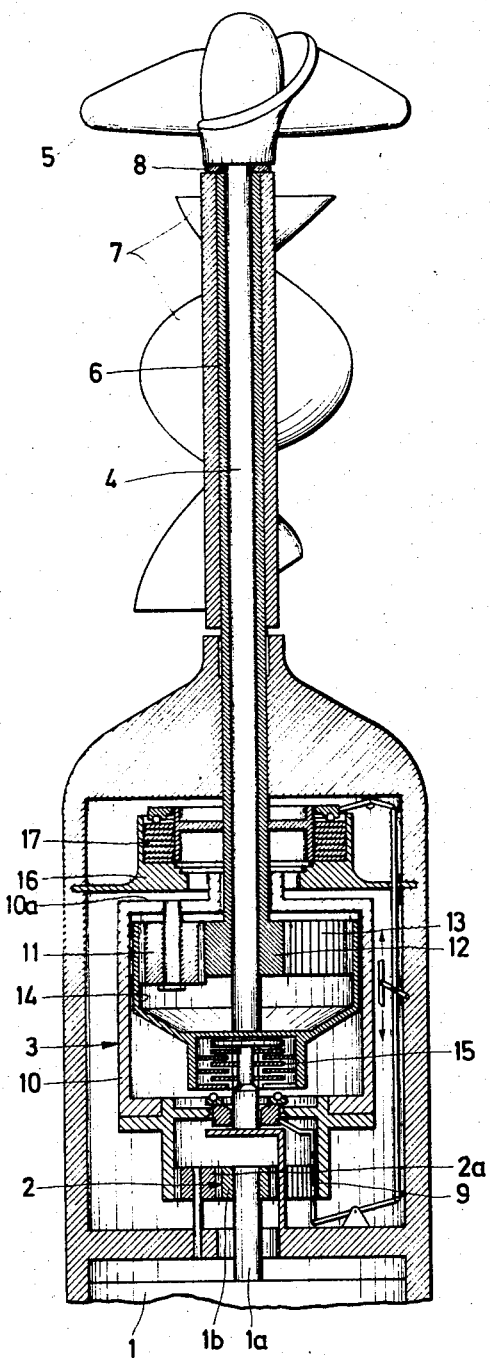
Fig.1a　　Fig.1b

PROPULSION SYSTEM FOR WATER CRAFT

SUMMARY OF THE INVENTION

This invention relates in general to ship propulsion systems and in particular to a new and useful propulsion system for water craft, particularly torpedo propulsion, which includes a driving engine such as a gas turbine which is connected through a reducing transmission to two separate screw drives which are adapted to operate in separate speed ranges.

A torpedo propulsion system is known where a gas turbine drives two coaxially arranged counter rotating shafts through a reducing gear. Each of the shafts carry ship screws equivalent in their screw characteristics, but such screws are adapted to operate simultaneously over their entire operational range. An inner shaft is driven by an externally arranged gear drive and the outer shaft is driven by a spur gear and an internal gear through a common shaft. For known reasons ship screws are designed so that they operate with good efficiency over as great a speed range and as satisfactory an acceleration as possible. In water craft which must perform special tasks, such as tug boats, the ship screws are designed for large water throughputs and low speeds. Water craft designed for high speeds are equipped with high speed screws and a poor acceleration characteristic is accepted. In order to provide screws which permit transitions from one type of operation to another it is known to employ screws or propellors having adjustable pitches. However, the equipment required for this construction is complicated and expensive.

It is an object of the present invention to provide a propulsion system for water craft having large speed ranges and which is simple in construction and operates efficiently in all speed ranges. In particular, the invention provides a system having low propulsion losses or flow losses and which is particularly employable with a high speed device such as a torpedo. The invention is also useful for example, for water craft having a hull which rises wholly or partially out of the water at high speeds such as a hydrofoil boat. In accordance with the invention, the propulsion system includes a plurality of screws with one of them being arranged for operation in the lower speed range and preferably also in the middle speed range and which rotates at a low speed of rotation, and at least one other which operates in an upper speed range and is rotated at a higher speed of rotation. The invention provides an advantage in that for the lower and the upper velocity ranges a sturdy ship screw of simple construction having an optimum design characteristic is available. In one embodiment two ship screws are arranged coaxially, one behind the other and the forward ship screw is arranged at a hollow shaft with the rear ship screw being arranged on a centrally located shaft which traverses the hollow shaft. The screw for high cruising speeds is located in front of the ship screw for the low propulsion speeds. In the preferred arrangement with the screws arranged coaxially the forward screw is designed such that it provides a guide blading for the rear screw. The arrangement is suitable for entirely eliminating the flow losses which in a torpedo, for example, the low speed screw would produce upon obtaining a high speed or a cruising speed at which time the propulsion is taken over by the high speed screw. The construction includes therefore means for throwing off the slow speed screw and this may be accomplished by a blasting charge which separates the screw from the associated shaft, so that it drops off. The explosive charge is adapted to be located between the hub of the screw and the hub of the high speed shaft.

In accordance with another feature of the invention, the high and low speed screws are contained on separate shafts which are arranged one above the other with the low speed screw on the uppermost portion so that it raises out of the water when the system is used on a hydrofoil boat. Thus, after the hydrofoil reaches planing speed, the low speed screw will lift out of the water and become ineffective and hence not cause any flow resistance.

Accordingly, it is an object of the invention to provide a propulsion system which includes a driving motor arranged to drive two separate screws through a transmission such that one of the screws is operated through a low speed range and the other screw is operated through a high speed range.

A further object of the invention is to provide a ship propulsion system which includes a driving engine arranged to drive two concentrically arranged shafts one being hollow and the other being arranged within the hollow one, the transmission being such that the outer screw is driven at a higher speed than the inner one and preferably with means for disconnecting the low speed screw after it has been operated through its low speed range.

A further object of the invention is to provide a hydrofoil vessel including a propulsion system including a slow speed shaft and screw mounted for rotation above a high speed shaft and screw, the low speed shaft being liftable out of the water after the hydrofoil reaches a planing speed.

A further object of the invention is to provide a propulsion system which is simple in design, rugged in construction and economical to manufacture.

The various features of novelty which characterize the invention are pointed out with particularity in the claims annexed to and forming a part of this specification.

For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1a is a partial longitudinal sectional view through a ship's propulsion system embodying the invention, illustrating the parts in the position for low speed operation;

FIG. 1b is a longitudinal sectional view through the transmission illustrating the parts in the position for high speed operation;

FIG. 2 is a sectional view taken on the line II — II of FIG. 1b; and

FIG. 3 is a graphical illustration of the efficiency curves for the various cruising speeds of a vessel having the ship's propulsion system of the invention.

GENERAL DESCRIPTION OF THE PREFERRED EMBODIMENTS

Referring to the drawings in particular, the invention embodied therein comprises, as indicated in FIGS. 1a and 1b a propulsion system which includes a driving engine such as a gas turbine 1, having a shaft 1a which is connected to a reduction gear or transmission generally designated 2. The transmission includes a drive gear 1b which meshes with a driven gear 2a which, in turn, meshes with an internal gear 9. The internal gear 9 is assigned to an outer or revolving differential housing 10 which includes a web portion 10a at its opposite end which rotatably carries at least one planetary gear 11. The planetary gear 11 is in engagement with a sun gear 12 and also externally with a internal gear 13 of an inner revolving differential housing 14. The housing 14 can be coupled by a brake 15 with a fixed machine housing 16.

In accordance with the invention a low speed range ship screw 5 is affixed to a first central shaft 4 for rotation therewith. When the slow speed screw 5 is to be rotated through its speed range, brake 15 is released and the revolving planetary wheel 11 drives through the internal gear 13 and the inner differential housing 14 to the shaft 4 to rotate the ship screw 5. The position of the parts is shown in FIG. 1b.

A high speed ship screw 7 is affixed to a hollow shaft 6 which surrounds the shaft 4 and it carries the sun gear 12. The hollow shaft 6 and the sun gear 12 are retained relative to the machine housing 16 by a second brake 17.

When the screw 7 is to be driven the central shaft 4 or the inner differential housing 14 is retained relative to the machine housing 16 by means of the brake 15 and the brake 17 is released, as shown in FIG. 1a. In such an instance, the sun gear 12 and hence the hollow shaft 6 as well as the ship screw 7 will be driven at a high speed of rotation by the outer revolving differential housing 10 and through the planetary gear 11.

The planetary gearing shown in FIGS. 1a and 1b works in the conventional manner. Thus, the shaft 1a represents the output shaft of any driving means 1, such as a motor or a gas turbine. Through the gears 1b and 2, shaft 1a drives internal ring gear 9 forming part of rotating housing 10 whose end wall 10a rotatably mounts planetary gears 11 engaged with sun gear 12 and also meshing with the internal ring gear forming part of carrier 14. Carrier 14 could also be termed the inner differential casing.

When driving ship's screw or propeller 5, built for low speeds, brake or entrainer clutch 17 is engaged, as shown in FIG. 1a, so that sun gear 12 is held stationary with planetary gear 11 rotating about the stationary sun gear 12. At the same time, brake or entrainer clutch 15 is disengaged, also as shown in FIG. 1a, so that inner differential casing 14 can rotate. Casing 14 is rotated by planetary gears 11 which roll around internal ring gear 12 and thus rotate inner differential casing 14. In turn, casing 14 rotates shaft 4 driving propeller 5.

FIG. 1b illustrates the position of the parts while driving the high speed ship screw or propeller 7. In this case, brake 17 is disengaged and brake 15 is engaged, so that carrier 14 is held stationary. The drive of hollow or tubular shaft 6 is effected through planetary gears 11 rolling around the stationary internal ring gear 13 and rotating sun gear 12 secured to rotate with shaft 6.

As illustrated, pinions 11 are mounted on shafts secured to end wall 10a of outer differential gear housing 10, and pinion 2 is illustrated as mounted on a pin secured to a shaft mounted in the housing for the gearing, such as being mounted on an annular partition of the outer housing.

As shown in FIG. 3, performance curves which are plotted with an abscissa showing ships velocity $v$ (or the velocity of a torpedo) and on the ordinate the ships screw efficiency is shown. The curve $a$ is designated the efficiency curve of the ship screw 5 and the curve $b$ shows the efficiency curve for the ship screw 7. In the low speed range designated $c$ the screw 5 is operative. In the high speed range indicated $d$ the screw 7 is operative. A switching from one screw to the other is effective at $e$.

What is claimed is:

1. A propulsion system for water craft, comprising driving motor means, a first shaft having a first high-speed propulsion screw thereon rotatable at relatively low first speed range, a second shaft having a second propulsion screw thereon rotatable through a relatively high second speed range, and transmission means connected between said driving motor means and said shafts for selectively and independently rotating said first and second shafts at respective said relatively low first speed range and said relatively high second speed range.

2. A propulsion system, according to claim 1, wherein said first and second shafts are arranged concentrically one within the other.

3. A propulsion system, according to claim 2, wherein said second propulsion screw is arranged aft of said first propulsion screw.

4. A propulsion system, according to claim 1, wherein said second propulsion shaft is hollow, said first propulsion shaft being located within said first shaft and having said first propulsion screw located aft of said second propulsion screw.

5. A propulsion system, according to claim 4, wherein said second propulsion screw is arranged forwardly of said first propulsion screw and provides a guide blading therefor.

6. A propulsion system, according to claim 1, wherein said transmission means includes means for driving said second propulsion shaft and said second propulsion screw during the operation of the last portion of the operation of said first propulsion screw and for automatically terminating operation of said first propulsion screw after said second propulsion screw is rotated.

7. A propulsion system, according to claim 1, including means associated with said first shaft for disconnecting said first propulsion screw from said shaft after it has operated through its speed range.

8. A propulsion system, according to claim 7, wherein said means for disconnecting said first propulsion screw from its associated first shaft comprises an explosive charge for blasting said screw off said shaft.

9. A propulsion system, according to claim 1, wherein said driving motor means comprises a gas turbine, said transmission means including a differential gearing and brake means associated with said transmission for shifting the drive from said gas turbine from said first shaft to said second shaft.

10. A propulsion system, for water craft, comprising driving motor means, a first ship propeller shaped to operate in the normal ship propulsion rotational speed range, a second shaft concentrically arranged in respect to said first shaft and having an axially extending spiral blade high speed propeller for rotation through a relatively high speed range, a transmission connected between said driving motor means and each of said first and second shafts and including means for stopping the drive of said first shaft and starting the drive of said second shaft and stopping the drive of said second shaft and starting the drive of said first shaft.

* * * * *

UNITED STATES PATENT OFFICE
CERTIFICATE OF CORRECTION

Patent No. 3,688,732         Dated September 5, 1972

Inventor(s) DIETRICH E. SINGELMANN ET AL

It is certified that error appears in the above-identified patent and that said Letters Patent are hereby corrected as shown below:

On the cover sheet insert

-- [30] FOREIGN PRIORITY DATA

Germany   December 21, 1968    P 18 16 306.9 --.

Signed and sealed this 8th day of May 1973.

(SEAL)
Attest:

EDWARD M. FLETCHER, JR.                ROBERT GOTTSCHALK
Attesting Officer                      Commissioner of Patents